United States Patent [19]
Roseanou

[11] Patent Number: 5,756,228
[45] Date of Patent: May 26, 1998

[54] ELECTROCHEMICAL DEVICE FOR GENERATING DIRECT CURRENT

[76] Inventor: Lou Roseanou, No. 6 Harakafot Street, Haifa, Israel

[21] Appl. No.: 713,196

[22] Filed: Sep. 12, 1996

Related U.S. Application Data

[63] Continuation of Ser. No. 350,339, Dec. 6, 1994, abandoned.
[51] Int. Cl.[6] .............. H01M 6/36; H01M 2/38
[52] U.S. Cl. .............. 429/68; 429/113; 429/127
[58] Field of Search .............. 429/110, 127, 429/113, 95, 67–70, 50; 29/623.3, 623.5

[56] References Cited

U.S. PATENT DOCUMENTS

| | | | |
|---|---|---|---|
| 3,454,429 | 7/1969 | Gruber | 429/127 X |
| 3,494,796 | 2/1970 | Grulke et al. | 429/127 |
| 4,615,958 | 10/1986 | Golz | 429/127 |
| 5,100,746 | 3/1992 | Muller et al. | 29/623.5 X |
| 5,290,642 | 3/1994 | Minh et al. | 429/127 X |

Primary Examiner—John S. Maples
Attorney, Agent, or Firm—Frishauf, Holtz, Goodman, Langer & Chick

[57] ABSTRACT

The electro-chemical apparatus for generating direct current comprises two flat and thin stainless steel tapes (30.30') representing anode and cathode respectively owing to the anode strip being covered with an anode material such as lithium. The tapes are wound of a first pair of spaced apart reels (31.31') at identical linear velocity and their inside surfaces are brought into a close relationship while the tapes are moved through the gap between two graphite block collectors (12.12') which are urged onto the tape outsides. After having passed the collectors the tapes are separated again and wound up on a second pair of spaced apart reels (32.32'). Before entering the gap between the collectors an electrolyte (22), such as thionyl chloride in a paste condition is evenly applied to the inside surface of one of the tapes. As soon as the tape insides are in a close relationship to each other within the gap between the collectors, current starts to be generated by electro-chemical reaction and to be collected by the graphite collectors upon having reached the desired level and is then conducted to a consumer.

21 Claims, 2 Drawing Sheets

ELECTROCHEMICAL DEVICE FOR GENERATING DIRECT CURRENT

This application is a Continuation of application Ser. No. 08/350,339, filed Dec. 6, 1994, now abandoned.

BACKGROUND OF THE INVENTION

The invention relates to a method and a light-weight chemo-mechanical apparatus for generating direct current. It relates particularly to a D-C generator having an adjustable, continuous output, contrary to the electro-chemical cell wherein the initial EMF is reduced during supply of current due to polarization of the electrodes.

One of the urgent technical problems is development of an electro-chemical cell or battery of low weight and relatively high discharge for use in vehicles, which should replace the internal combustion engines used up to date. It is a fact that combustion of fuel in motor vehicles and in all other ways not only makes life difficult in towns, but causes an increase of carbon dioxide in the atmosphere, while destroying the protective oxone layer in the atmosphere. This is the reason for trying to find ways for reducing fuel consumption to a minimum by supplying alternative power sources, at least for motor vehicles which are a major source of air pollution, especially in large cities. Even, if an electro-chemical low-weight, rechargeable battery could be developed as a replacement for a combustion engine, it would require electric current supplied by a power station which, again, burns fossil fuel and thereby emits air polluting chemical. On the other hand, there already exist battery-driven vehicles, but they are generally limited to a travel distance of about 50 km per charge, since the heavy weight of the batteries allows only a limited number to be installed in each vehicle.

It is therefore, the main object of the present invention to provide a source of electric current which is not dependent on fuel combustion, but generates direct current by electro-chemical reaction.

It is another object to provide a D-C generating device of low weight suitable for installation in a motor vehicle allowing the vehicle to travel a considerable distance without recharging or exchange of the device.

The device should provide electric current by electro-chemical reaction without the effect of polarization of electrodes as in conventional batteries, thereby permitting a higher EMF to be obtained from each unit.

It is still another object to provide a D-C generating device of simple design and with means for controlling its output in accordance with the power requirements of the vehicle at each moment.

It is an additional object to provide a current generating device of large output per weight unit, which will produce the required energy at low cost, possibly at lower cost than a combustion engine at present fuel prices.

And it is a further object to provide such device at low cost so as not to raise the total price of a motor vehicle beyond its present cost.

SUMMARY OF THE INVENTION

The D-C generation device of the present invention essentially comprises two strips of a conductive material representing a respective anode and cathode moving at substantially identical velocity from non-contacting alignment into a close relationship along a reaction path of travel with an electrolyte continuously supplied between the two strips, these strips together with the electrolyte constituting an electro-chemical cell. Current collectors or brushes are provided in the reaction path area on the outside of the two strips and serve to conduct the current to an electric motor or other consumer.

The two strips which are thin and of a chemically passive material are wound off two first reels ahead of the contact stretch and are wound up on two second reels beyond the contact stretch, while a number of rollers support the strips on both sides of the contact stretch. The anode strip is coated on its respective contact side with an anode material which is consumed during the passage through the contact stretch, permitting the re-use of the strip after cleaning and re-coating. A preferred strip material is stainless steel which may be initially coated with a non-corroding metal such as a noble metal, and one strip is coated with a very thin layer of anode material. Any material generally used in commercial battery systems may be employed as long as they can be applied to the steel strip in the form of a very thin layer as expressed in a few microns. An electrolyte of liquid or easily flowing, pasty constitution is applied in between the two strips, which is then squeezed into a very thin layer and reacts with the anode material and the other strip.

A preferred chemical coating is lithium as an anode and thionyl chloride ($SOCl_2$) as an electrolyte for interaction, the latter being supplied in an easily flowing paste form from a container and poured between the two strips prior to their entering the contact zone.

Simultaneous linear velocities of the two strips are obtained by means of an electric motor driving the second reels at identical rotational speeds, whereby the strips are wound off the first reels and pulled through the contact area.

The strips should be as thin as possible, without danger of their tearing, and it is proposed to use stainless steel of 10 micron thickness and a width of between 50 and 300 mm, moving at a velocity of between 1 to 50 mm/s in accordance with the required output.

SHORT DESCRIPTION OF THE DRAWINGS

DETAILED DESCRIPTION OF THE DRAWINGS

Figure 1:
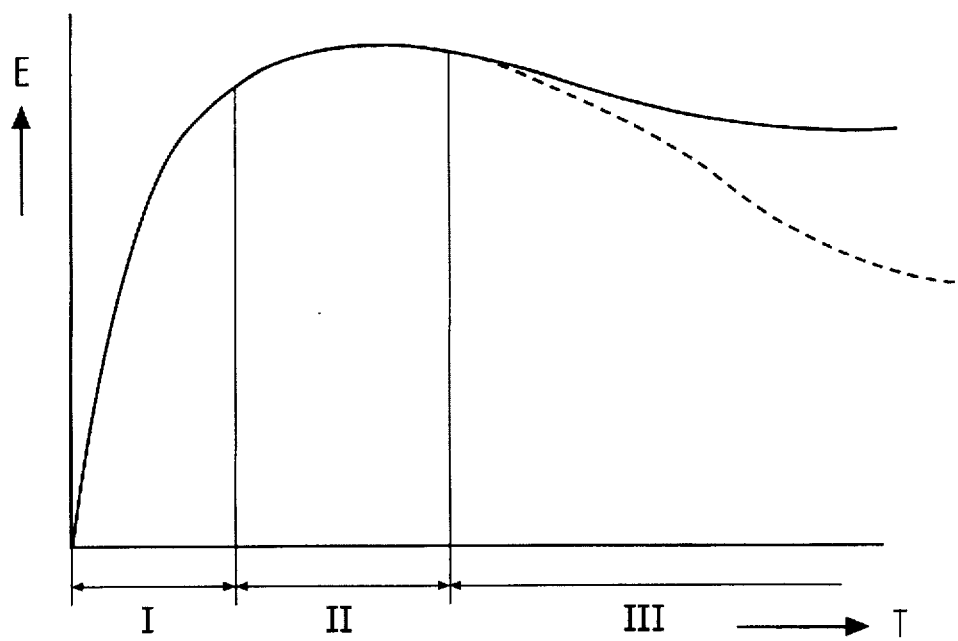
FIG. 1 is a characteristic curve illustrating the output voltage of a conventional electrochemical cell.

The curve of FIG. 1 is that of a conventional electro-chemical cell, showing the output voltage as a function of time in three separate regions. In region I the anode-electrolyte interface is built up and the cell voltage starts rising. In region II the voltage rise slows down and, eventually, reached its maximum level at the given intensity of discharge. Beyond this region the voltage drops due to polarization to a level and at a rate which depend on the intensity of the current drawn, as shown in region III. Due to the fact that in the present apparatus fresh anode, cathode and electrolyte materials is continuously fed into the current-generating zone and that the cell is disassembled at the end of region II, polarization is practically eliminated, as described in the curve of FIG. 3.

Figure 2:
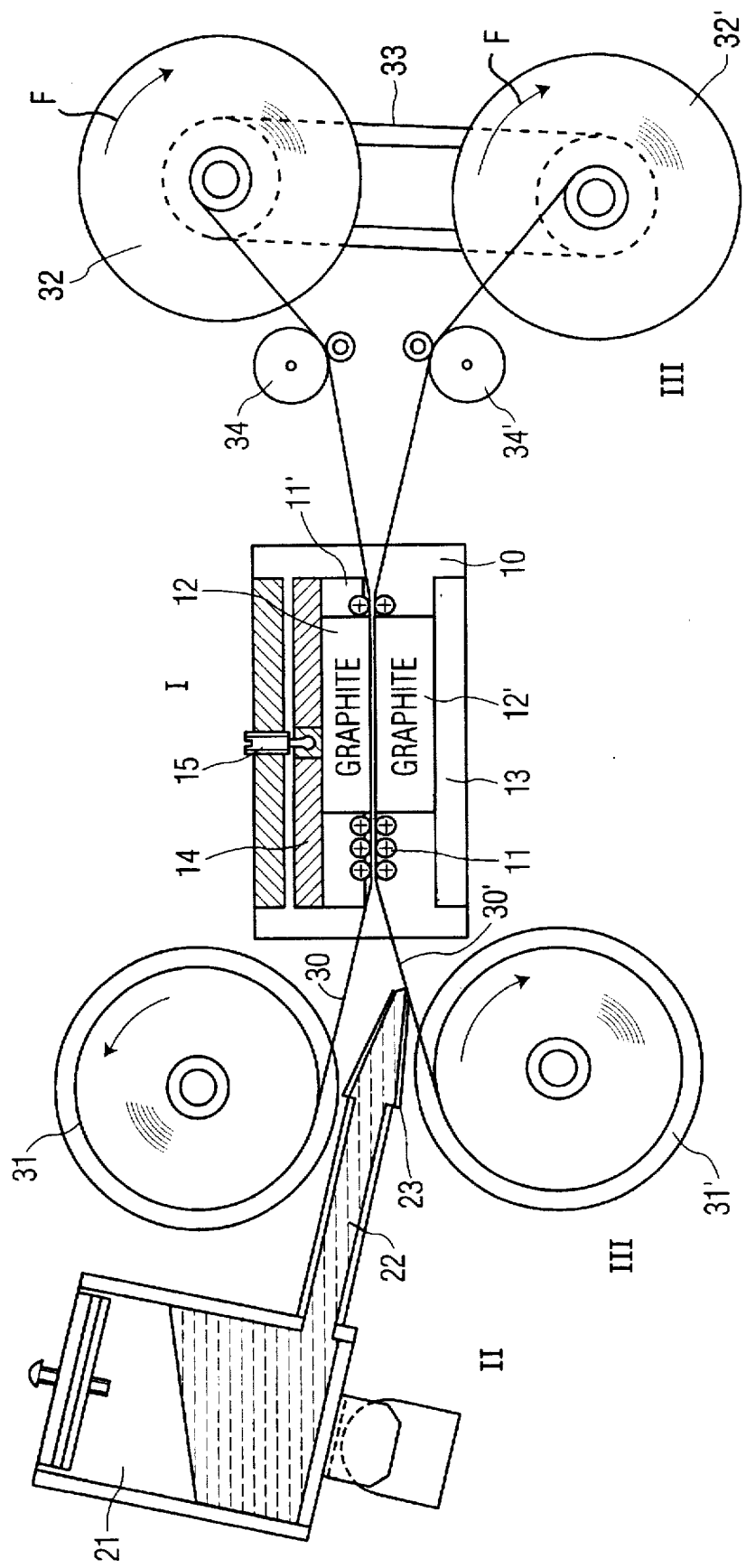
FIG. 2 is a schematical side view of an apparatus according to the present invention.

The apparatus illustrated in FIG. 2 comprises essentially a current generation station I, a electrolyte-supplying station II and a strip supplying and moving device III. The current generation station includes a housing 10 provided with two pairs of opposite rollers 11 and 11' serving to guide two conductive strips 30 and 30' in close relationship between two graphite current collectors or brushes 12 an 12'. The lower brush 12' is supported by the base 13 of the housing 10, while the upper brush is urged in downward direction by means of a platen 14 and a prestressed screw 15. The strips 30 and 30' are initially stored on two reels 31 and 31' on the upstream side of the station I and are moved through this station and transferred to two downstream reels 32 and 32' which are rotated in the direction of the arrow F. Rotation is obtained by means of a motor 35 and a transmission 36 coupled to one of the reels while the other reel is rotated in the same sense of rotation by a chain drive 33. Guide pulleys 34 and 34' direct the strips onto the reels.

Electrolyte 22 is applied to one of the two strips out of a container 21 by means of a supply pipe through a flat spout in contact with the strip 30'. The spout is flat this covering substantially the entire width of the strip while this moves into the station I, where the electrolyte is squeezed between the two strips and carried forward towards the reels 32 and 32'. The chemical process takes place between the roller pair 11 and 11' and the obtained current is collected from the conductive strips by the brushes 12 and 12' and transferred to the user by conductor means now shown in the drawing.

A preferred anode material is lithium which is uniformly applied to the inside surface of one of the strips on the side facing the second strip which serves as the cathode. The electrolyte in this case is thionyl chloride ($SOCl_2$) in easily flowing paste form which is contained in the container 21 and supplied to the strip through the spout 23.

Tests have been carried out with a layer of lithium of a thickness of 10 microns on a strip of 100 mm width which was moved through the station at a velocity of 10 mm/s The current supplied at 3.4 V was 34 W.s. per 10 mm strip. The contact length between the roller pairs was 340 mm, therefore the theoretically obtainable current is 1156 W. or 1.156 kW.

Figure 3:
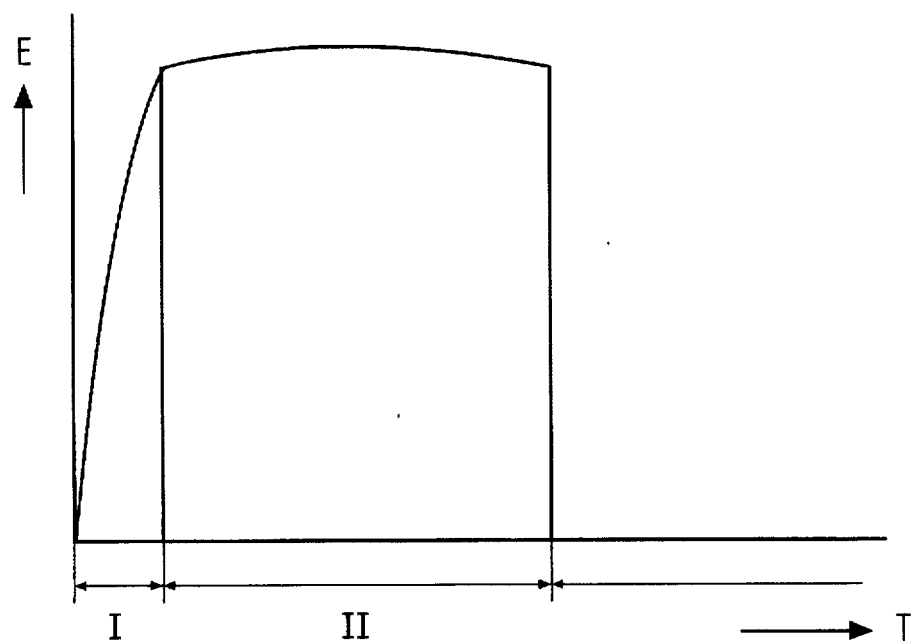
FIG. 3 is a characteristic curve illustrating the output voltage of a point of the strip while moving through the current gathering apparatus.

Referring now to the curve shown in FIG. 3, section I is equivalent to the stretch occupied by the rollers 11, wherein the electro-chemical reaction increases rapidly, until it reaches the maximum voltage at the end of section I. A substantially constant voltage level is maintained during the passage of each point through the section II which corresponds to the reaction path extending between the rollers 11 and 11', approximately in the area covered by the current collectors 12 and 12' (v. FIG. 2). At the end of the reaction path the anode material should be consumed, the strips are separated form each other and the action of the cell ceases.

The following is an example of a calculation of a battery supplying 1 kWh=$3.6 \times 10^6$ joule, or 1 J/s.

1 g.atom Li (6.1 g) yields 96500 coulombs$\times 3.4$ V=$3.281 \times 10^5$ J.

1 g Li yields 328100/6.1=53790 J.

Since the volume of 1 g Li=1.887 $cm^3$, therefore 1 $cm^3$ Li yields 53790/1.887=28510 J, therefore required for 1 kWh: - 3600000/28518=126.3 $cm^3$ Li; or for 1000 J/s 126.3/3600= 0.0351 $cm^3$ of lithium.

Provided current intensity per $cm^2$ is 1 $A/cm^2$ at V=3.4, then the reaction area required for 1 kWh=1000 J/s=1000/3.4=294 $cm^2$.

Thickness of the layer of Li evenly spread over the reaction area of 294 $cm^2$: - D=0.0351/294=1.2 microns. Assuming that the width of the strip is 10 cm, then the length of the reaction area is about 30 cm, and assuming that the output remains reasonably high and even for a period of 15 seconds, the velocity of the strip must be 2 cm/s. At this velocity the layer of Li required must be 15 times as thick, i.e. $15 \times 1.2 = 18$ microns.

At a strip speed of 2 cm/s the total length for 1 kWh must be $2 \times 3600 = 7200$ cm=72 m.

Taking into account various losses, as well as driving power, a suitable length will be at least 80 m of steel strips per hour. Since it is desired to use the battery for a longer period, it is evident that a multiple length should be employed.

The energy required for driving a standard car is about 25 kWh and it is intended to install 8 units each weighing about 3 kg each. The steel strips are of a thickness of 10 micron having a width of 27 cm and a length of 122 m each per kWh, when the theoretical layer thickness is about 15 microns. The strip speed should be about 3.5 cm/s at a contact length of 35 cm. The units have to be exchanged, depending on the length of the steel strips and the average power consumed.

It is intended to re-use the steel strips after the lithium has been partly or completely consumed, by cleaning them and reapplying the layer of lithium. Since the maximum power is rarely required in a car, it is proposed to provide electronic control means, either for controlling the speed of the strips or by closing down one or more of the eight units.

It will be understood that the use of lithium and of the chosen electrolyte has been chosen as an example only, and that other electrochemically reacting materials may be used, as employed in known battery systems as well as with materials discovered as useful in future. It can be shown that the system can price-wise compete with internal combustion engines, with the enormous advantage of non-pollution and no-noise produced by motor vehicles provided with the apparatus according to the invention.

I claim:

1. An electro-chemical device for electro-chemically generating a direct current which comprises:

two strips of a conductive material, each of said two strips having an inside surface and an outside surface, said two strips representing respectively an anode and a cathode, said two strips being moved from two spaced apart storage devices at substantially identical velocities, the inside surface of each of said two strips coming into a close relationship along a path of travel, an electrolyte being continuously supplied onto the inside surface of one of said two strips before said path of travel, and at least one current collector which is in contact with said two strips and which collects electro-chemically generated direct current, said at least one current collector for conducting direct current to a current consumer.

2. The device as defined in claim 1, wherein said strips are flat and are thin metal strips of substantially identical width.

3. The device of claim 2, wherein, said metal strips are stainless steel strips.

4. The device of claim 3, wherein said metal strips are of a chemically passive material.

5. The device of claim 3, wherein said stainless steel strips are of a thickness of 10 micron.

6. The device of claim 1, wherein the inside surface of at least one of said metal strips is covered with an anode material which is consumed during passage through said path by an electrolyte which is reactive with said anode material.

7. The device of claim 1, wherein said two storage devices are two first reels, said two strips being respectively wound off said two first reels, are conveyed through said path and are wound up on two second reels mounted after said path, said second two reels being rotated at substantially identical velocities by motor means and transmission means.

8. The device of claim 1, wherein said strips are urged into contact with each other by application of pressure on their outside surfaces by rollers mounted within said path.

9. The device of claim 1, wherein the surfaces of said strips during their passage through said path are substantially horizontal.

10. The device of claim 9 wherein said electrolyte is stored in a container and poured onto the inside surface of a lower positioned strip by means of a spout of a width coextensive with the width of said strip.

11. The device of claim 1, wherein said current collectors are graphite blocks urged onto the outside of said strips in said path.

12. The device of claim 6, wherein the anode material covering the inside of one of said strips is lithium, and wherein said electrolyte is thionyl chloride in a paste form.

13. The device of claim 8, wherein said two strips are guided onto said second reels by guide pulleys.

14. The device of claim 1, said device delivering 25 kWh in the form of eight identical units, each unit containing said two strips of stainless steel of a width of 270 mm, one of said strips being covered by a layer of lithium, said strips being conveyed at a linear velocity of 35 mm/s through the path, said path having a length of 350 mm, and wherein the electrolyte is thionyl chloride in a flowing paste form.

15. The device of claim 14, wherein said layer of lithium on the inside of one of said strips is 15 microns thick.

16. The device of claim 1, wherein the two strips are stainless steel.

17. The device of claim 16, wherein the two strips have a width of 50 to 300 nm.

18. The device of claim 17, wherein the two strips move at a velocity of 1 to 50 mm/s.

19. An electro-chemical device for electro-chemically generating a direct current which comprises:

two strips of a conductive material, each of said two strips having an inside surface and an outside surface, one of said two strips having a lithium coating on an inside surface thereof and being an anode, the other of said two strips being made of stainless steel and being a cathode, said two strips being moved from two spaced apart storage devices at substantially identical velocities, the inside surface of each of said two strips coming into a close relationship along a path of travel, an electrolyte being continuously supplied onto the inside surface of the cathode before said path of travel, and at least one current collector which is in contact with said two strips and which collects electro-chemically generated direct current, said at least one current collector for conducting direct current to a current consumer.

20. The electrochemical device of claim 19, wherein the electrolyte is thionyl chloride.

21. The electro-chemical device of claim 20, wherein the anode is stainless steel having the lithium coating on an inside surface thereof.

* * * * *